US011520086B2

(12) United States Patent
Kim et al.

(10) Patent No.: US 11,520,086 B2
(45) Date of Patent: Dec. 6, 2022

(54) OPTICAL ISOLATION ELEMENT

(71) Applicant: LG CHEM, LTD., Seoul (KR)

(72) Inventors: Byung Mook Kim, Daejeon (KR);
Sang Choll Han, Daejeon (KR); Seong Min Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 214 days.

(21) Appl. No.: 16/769,176

(22) PCT Filed: Dec. 12, 2018

(86) PCT No.: PCT/KR2018/015754
§ 371 (c)(1),
(2) Date: Jun. 2, 2020

(87) PCT Pub. No.: WO2019/117615
PCT Pub. Date: Jun. 20, 2019

(65) Prior Publication Data
US 2021/0215859 A1    Jul. 15, 2021

(30) Foreign Application Priority Data

Dec. 15, 2017 (KR) .................. 10-2017-0173335
Dec. 10, 2018 (KR) .................. 10-2018-0158326

(51) Int. Cl.
*G02B 5/04* (2006.01)
*G02B 5/18* (2006.01)
*G02B 5/20* (2006.01)

(52) U.S. Cl.
CPC .............. *G02B 5/04* (2013.01); *G02B 5/18* (2013.01); *G02B 5/203* (2013.01)

(58) Field of Classification Search
CPC . G02B 5/04; G02B 5/18; G02B 5/203; G02B 5/003; G02B 5/045;
(Continued)

(56) References Cited

U.S. PATENT DOCUMENTS 4,736,382 A    4/1988  O'Meara
5,661,603 A *  8/1997  Hanano .................. G02B 30/35
                                                           359/628
(Continued)

FOREIGN PATENT DOCUMENTS

JP    0821748 A      1/1996
JP    H0821748 A  *  1/1996  ............... G02B 5/00
(Continued)

OTHER PUBLICATIONS

English language machine translation of Hashimoto JP H0821748 A (Year: 1996).*

*Primary Examiner* — Marin Pichler
(74) *Attorney, Agent, or Firm* — Dentons US LLP

(57) ABSTRACT

An optical isolation element comprising, sequentially: a light control film; a first optical path changing element; and a second optical path changing element. The optical isolation element has an excellent optical isolation ratio, and can be manufactured simply and at low cost. Such an optical isolation element can be applied, for example, to the fields of optical communication or laser optics, security and privacy protection, and members for brightness enhancement in displays or military products requiring hiding and covering, and the like.

11 Claims, 2 Drawing Sheets

(58) Field of Classification Search
CPC ........................ G02B 2207/123; G02B 5/32; G02B 27/0172; G02B 27/0081; G02B 30/35; G02B 2027/011; G02B 2027/0132; G02B 2027/0178; G02B 5/021; G02B 5/0231; G02B 17/006; G02B 19/0019; G02B 6/0025; G02B 6/0053; G02B 27/12; H01S 3/0064; G03H 2001/0439
USPC .... 359/599, 484.03, 484.04, 484.06, 484.08, 359/485.06, 489.09, 1, 15, 3
See application file for complete search history.

(56) References Cited

U.S. PATENT DOCUMENTS

| | | |
|---|---|---|
| 2004/0212790 A1 | 10/2004 | Leidig |
| 2006/0176554 A1* | 8/2006 | Kuo .................. G02B 27/0103 385/115 |
| 2009/0199900 A1* | 8/2009 | Bita ..................... G03H 1/0408 359/15 |
| 2010/0180946 A1* | 7/2010 | Gruhlke ............. H01L 31/0547 264/2.7 |
| 2016/0186948 A1 | 6/2016 | Gardiner et al. |

FOREIGN PATENT DOCUMENTS

| | | |
|---|---|---|
| JP | 08129146 A | 5/1996 |
| JP | 2007279424 A | 10/2007 |
| KR | 10-0326106 B1 | 2/2000 |
| KR | 10-1095809 B1 | 12/2011 |
| KR | 10-1441382 B1 | 9/2014 |
| KR | 10-2017-0010848 A | 2/2017 |
| KR | 10-2018-0041080 A | 4/2018 |

* cited by examiner

[Figure 1]
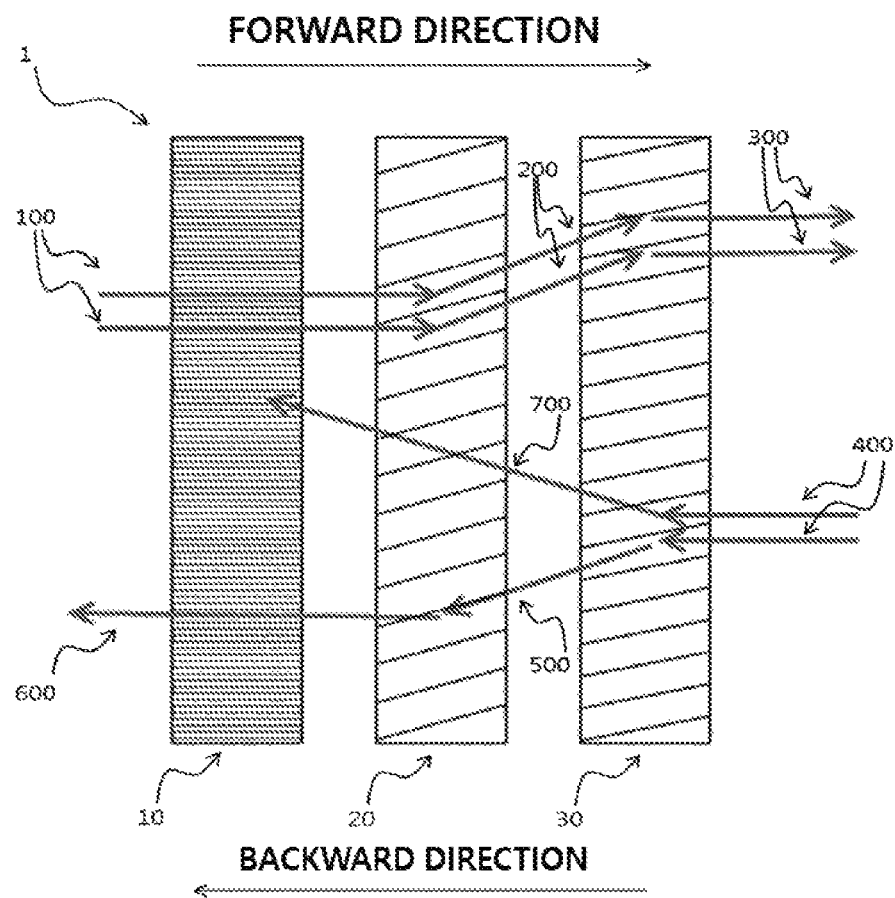

[Figure 2A]　　　[Figure 2B]　　　[Figure 2C]
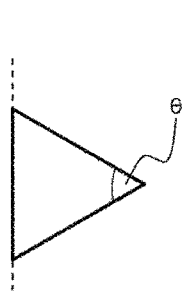 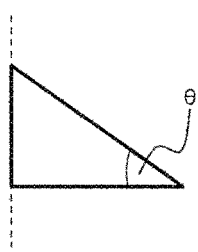 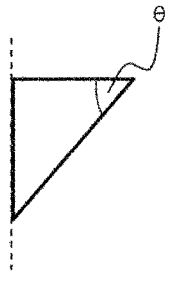
[Figure 2D]
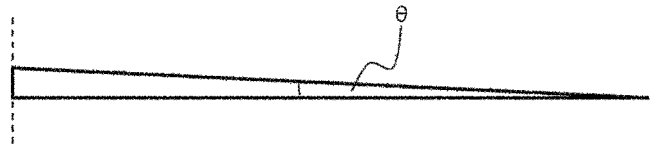
[Figure 2E]
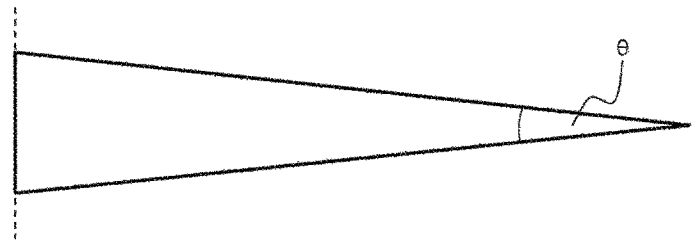

OPTICAL ISOLATION ELEMENT

CROSS-REFERENCE TO RELATED APPLICATIONS

This application is a U.S. national stage of international Application No. PCT/KR2018/015754 filed on Dec. 12, 2018, and claims the benefit of priority based on Korean Patent Application No. 10-2017-0173335 filed on Dec. 15, 2017 and Korean Patent Application No. 10-2018-0158326 filed on Dec. 10, 2018, the disclosures of which are incorporated herein by reference in their entirety.

TECHNICAL FIELD

The present application relates to an optical isolation element.

BACKGROUND

An optical isolation device is a device in which light transmittance in the forward direction is higher than light transmittance in the backward direction, which is also called an optical diode. The optical isolation device can be used to prevent unnecessary reflected light in the field of optical communication or laser optics, and can also be applied to a building or automobile glass to be used for security or privacy protection and the like. Furthermore, the optical isolation device can be applied for brightness enhancement in various displays, or military products requiring hiding and covering, and the like.

SUMMARY

The present application relates to an optical isolation element and an optical isolation device.

In an exemplary embodiment, the present application relates to an optical isolation element. The invention of the present application will be described with reference to FIGS. 1 and 2.

In this specification, the term "optical isolation element" may mean an element configured such that the transmittance of light incident in the forward direction is relatively larger than the transmittance of light incident in the backward direction. The forward direction may mean a direction where the light incident on the optical isolation element has the greatest transmittance and the backward direction may mean a direction where the light incident on the optical isolation element has the lowest transmittance. The ratio (B/F) of the transmittance in the backward direction (B) to the transmittance in the forward direction (F) may be 0.7 or less, 0.6 or less or 0.5 or less, and the lower limit is not particularly limited, but may be, for example, 0 or more, or more than 0. In the present application, the light entrance surface may mean a surface on which light incident in the forward direction of the optical isolation element is incident, and the light exit surface may mean a surface through which light incident in the forward direction of the optical isolation element is emitted.

In the present application, the reference wavelength of optical properties, such as the terms "transmittance," "retardation value," "reflectance" and "refractive index," can be determined according to light to be isolated by using the optical isolation element or the optical isolation device. For example, when the light in the visible light region is intended to be isolated using the element or device of the present application, the transmittance or the like may be, for example, a value based on the light having any one wavelength in a range of 400 nm to 700 nm or a wavelength of about 550 nm; when the light in the infrared region is intended to be isolated, the transmittance or the like may be, for example, a value based on the light having any one wavelength in a range of 700 nm to 1000 nm or a wavelength of about 850 nm; and when the light in the ultraviolet region is intended to be isolated, the transmittance or the like may be, for example, a value based on the light having any one wavelength in a range of 100 nm to 400 nm or a wavelength of about 300 nm.

In the present application, the term "incident angle" may be an angle measured based on the normal of the light entrance surface, unless otherwise specified. At this time, the angle measured in the clockwise direction based on to the normal is represented by a positive number (+), and the angle measured in the counterclockwise direction is represented by a negative value (−). In addition, the term "output angle" is an angle measured based on the normal of the light exit surface, where the angle measured in the clockwise direction based on the normal is represented by a positive number (+) and the angle measured in the clockwise direction is represented by a negative number (−).

In the present application, the value indicating the degree)(° may be a value considering an error range. The value indicating the angle may mean, for example, vertical, parallel, an incident angle and/or an output angle, and the error range may be in a range of ±1 degree, ±2 degrees, ±3 degrees, ±4 degrees or ±5 degrees.

The present application relates to an optical isolation element. The optical isolation element of the present application may comprise a light control film; a first optical path changing element; and a second optical path changing element.

In an exemplary embodiment, the optical path changing elements and the light control film may have each a light entrance surface and a light exit surface, where the light exit surface of the light control film and the light entrance surface of the first optical path changing element may face each other.

In another exemplary embodiment, the light exit surface of the first optical path changing element and the light entrance surface of the second optical path changing element may face each other.

In another exemplary embodiment, the element may comprise a light control film; a first optical path changing element; and a second optical path changing element sequentially.

In another exemplary embodiment, the light exit surface of the light control film and the light entrance surface of the first optical path changing element may be in contact with each other.

In another exemplary embodiment, the light exit surface of the first optical path changing element and the light entrance surface of the second optical path changing element may be in contact with each other.

BRIEF DESCRIPTION OF DRAWINGS

FIG. 1 is a schematic illustration of the structure of the optical isolation element according to an exemplary embodiment.

FIGS. 2A to 2E are schematic illustrations of usable prism cross sections in relation to an optical path changing element according to various exemplary embodiments, where the dotted lines represent a base having a triangular cross section, and θ is an apex angle.

REFERENCE NUMERALS USED HEREIN

1: optical isolation element
10: light control film
20: first optical path changing element
30: second optical path changing element
100: incident light at a first angle incident in the forward direction
200: emission light at a second angle emitted in the forward direction
300: emission light at a first angle emitted in the forward direction
400: incident light at a first angle incident in the backward direction
500: emission light at a second angle emitted in the backward direction
600: emission light at a first angle emitted in the backward direction
700: incident light which is incident in the backward direction and blocked from a light control film.

DETAILED DESCRIPTION

In this specification, the term "optical path changing element" may mean an optical element capable of changing an optical path of incident light. For example, the optical path changing element may mean an element capable of changing the traveling path of light by refracting or diffracting incident light. The term "light control film" may mean a film that transmits only light incident at a predetermined angle.

The first optical path changing element may be an element capable of emitting the light incident on the forward light entrance surface at an incident angle of a first angle to an output angle of a second angle. In addition, the first optical path changing element may be an element capable of emitting the light incident on the forward light exit surface at an incident angle of a second angle to an output angle of a first angle. Here, the first and second angles may be different from each other.

The second optical path changing element may be an optical element which can emit the light incident on the forward light entrance surface at the incident angle of the second angle to the output angle of the first angle and can emit the light incident on the forward light exit surface at the incident angle of the first angle to the emission light having the second angle and/or a third angle. In an exemplary embodiment, the second angle and the third angle may have the same value or different values. In another exemplary embodiment, the second angle and the third angle may have opposite signs. In another exemplary embodiment, the third angle and the second angle may have the same value but may have opposite signs.

On the other hand, the light control film may be an optical element capable of transmitting the light incident on a forward light entrance surface or a forward light exit surface at an incident angle of a first angle, and blocking the light incident at an angle different from the first angle. At this time, the blocking may mean absorption or reflection.

In an exemplary embodiment, the first optical path changing element can emit the light incident on the forward light entrance surface at an incident angle of a first angle to only the emission light at an output angle of a second angle different from the first angle. As used herein, "the first optical path changing element emits the light incident on the forward light entrance surface at an incident angle of a first angle to only the emission light at an output angle of a second angle different from the first angle" may mean a case where the ratio ($I_2/I_1$) of the emission light ($I_2$) emitted at the output angle of the second angle and the incident light ($I_1$) incident at the incident angle of the first angle is 10% or more, 20% or more, 30% or more, 40% or more, 50% or more, 60% or more, 70% or more, 80% or more, 90% or more, or 95% or more, and most ideally may mean a case where the ratio ($I_2/I_1$) is 100%.

In an exemplary embodiment, the second optical path changing element can emit the light incident on the forward light exit surface at an incident angle of a first angle to only the emission light at an output angle of a second angle and the emission light at an output angle of a third angle. As used herein, "the second optical path changing element emits the light incident on the forward light exit surface at an incident angle of a first angle to only the emission light at an output angle of a second angle and the emission light at an output angle of a third angle" may mean a case where the ratio (($L_2+L_3$)/$L_1$) of the sum of the emission light ($L_2$) at the output angle of the second angle and the emission light ($L_3$) at the output angle of the third angle and the incident light ($L_1$) incident on the forward light exit surface at the incident angle of the first angle is 80% or more, 85% or more, 90% or more, or 95% or more, and most ideally may mean a case where the ratio (($L_2+L_3$)/$L_1$) is 100%.

In another exemplary embodiment, the first angle may be an angle of more than −90 degrees to less than 90 degrees (−90 degrees to 90 degrees). For example, the first angle may be −80 degrees or more, −70 degrees or more, −60 degrees or more, −50 degrees or more, −40 degrees or more, −30 degrees or more, −20 degrees or more, −10 degrees or more, or −5 degrees or more. Alternatively, the first angle may be, for example, 80 degrees or less, 70 degrees or less, 60 degrees or less, 50 degrees or less, 40 degrees or less, 30 degrees or less, 20 degrees or less, 10 degrees or less, or 5 degrees or less. In one example, the first angle may be substantially about 0 degrees.

In another exemplary embodiment, the second angle may be 5 degrees or more and 65 degrees or less (5 degrees to 65 degrees). In another example, the second angle may be 5 degrees or more, 10 degrees or more, 15 degrees or more, 20 degrees or more, 25 degrees or more, 30 degrees or more, 35 degrees or more, or 40 degrees or more. Alternatively, the second angle may be 65 degrees or less, 60 degrees or less, 58 degrees or less, 56 degrees or less, 54 degrees or less, 52 degrees or less, or 50 degrees or less. In one example, the second angle may be substantially about 45 degrees.

In another exemplary embodiment, the second angle may be −65 degrees or more and −5 degrees or less (−65 degrees to −5 degrees). The second angle may be −5 degrees or less, −10 degrees or less, −15 degrees or less, −20 degrees or less, −25 degrees or less, −30 degrees or less, −35 degrees or less, or −40 degrees or less. Alternatively, the second angle may be −65 degrees or more, −60 degrees or more, −58 degrees or more, −56 degrees or more, −54 degrees or more, −52 degrees or more, or −50 degrees or more. In one example, the second angle may be substantially −45 degrees.

In another exemplary embodiment, the third angle may be an angle having the same value as that of the second angle and the opposite sign. For example, if the value of the second angle is in the clockwise direction with respect to the normal of the forward light entrance surface or the forward light exit surface, the value of the third angle may be in the counterclockwise direction with respect to the normal of the forward light entrance surface or the forward light exit surface. Also, if the value of the second angle is in the counterclockwise direction with respect to the normal of the forward light entrance surface of the forward light exit surface, the value of the third angle may be in the clockwise direction with respect to the normal of the forward light entrance surface or the forward light exit surface.

The optical isolation element of the present application may be an element in which the transmittance of the light incident on the light entrance surface is relatively higher than the transmittance of the light incident on the light exit surface by realizing the structure satisfying the first to third angles. In addition, it is possible for the light transmittance of incident light of an optical element in both directions to be asymmetric.

FIG. 1 is a schematic illustration of an optical isolation element, and the corresponding optical path change, according to an exemplary embodiment of the present application. As illustrated in FIG. 1, the optical isolation element (1) of the present application may comprise a light control film (10), a first optical path changing element (20), and a second optical path changing element (30). The incident light (100) incident on the forward light entrance surface of the light control film (10) at the incident angle of the first angle is transmitted through the light control film (10) and then is incident on the forward light entrance surface of the first optical path changing element (20). The first optical path changing element (20) can emit the incident light (100) incident on the forward light entrance surface at the incident angle of the first angle as the emission light (200) at the output angle of the second angle. The emission light (200) at the second angle can be incident on the forward light entrance surface of the second optical path changing element (30) and the incident light (200) incident on the forward light entrance surface of the second optical path changing element (30) at the incident angle of the second angle can be emitted as the emission light (300) at the output angle of the first angle.

On the other hand, in the optical isolation element (1) of the present application, the incident light (400) at the first angle which is incident on the forward light exit surface of the second optical path changing element (30) can be emitted as the emission light (500) at the second angle and/or the emission light (700) at the third angle. The emission light (500) at the second angle and the emission light (700) at the third angle are incident on the forward light exit surface of the first optical path changing element (20) as the incident light (500) at the second angle and the incident light (700) at the third angle, respectively, from which the incident light (500) at the second angle is emitted as the emission light (600) at the first angle in the first optical path changing element (20), but the incident light (700) at the third angle is emitted as the emission light (700) at an angle different from the first angle. Among the light emitted from the first optical path changing element (20), the emission light (600) emitted at the first angle is transmitted through the light control film (10) and emitted, but the emission light (700) emitted at angles other than the first angle is blocked by the light control film (10), so that it cannot be emitted in the backward direction of the optical isolation element (1). The optical isolation element of the present application can achieve different transmittance in both directions by adjusting the optical paths as described above.

In an exemplary embodiment, the first optical path changing element and the second optical path changing element may each be a prism film in which a plurality of linear unit prism structures are formed on one surface. In the present application, the term "prism" may mean an optical element in the form of a polyhedron having flat surfaces on which light is incident, and may mean a transparent optical element formed of a transparent solid material that refracts or reflects light. The shape of the prism is not particularly limited as long as the path of the light incident on the light entrance surfaces or the light exit surfaces of the first optical path changing element and the second optical path changing element can be changed as in the above-described optical path. For example, a prism whose vertical cross section orthogonal to the ridge line (direction) of the prism has a triangular shape may be used. At this time, in each optical path changing element, the prism may be formed so that the ridge lines of the plurality of prisms are arranged in parallel. This arrangement can be referred to as a linear prism arrangement.

In another exemplary embodiment, the first optical path changing element may be an element capable of emitting light such that 'the light width (A) of the light incident on the light entrance surface of each prism included in the first optical path changing element at the incident angle of the first angle' is different from 'the light width (B) of the light emitted from each prism at the output angle of the second angle.' The light width may mean the width of the incident light and/or the emission light observed in a direction perpendicular to the light incident at the incident angle of the first angle and the light emitted at the output angle of the second angle. For example, when the first optical path changing element comprises a prism whose vertical cross section (orthogonal to the ridge line direction) has an inequilateral triangle shape and one side (base) of the right-angled sides coincides with the light entrance surface, the light width (A) of the light incident in the forward direction at the incident angle of the first angle and the light width (B) of the emission light which is incident on the first optical path changing element at the incident angle of the first angle and emitted to the output angle of the second angle may be different. In this case, the light incident on the forward light entrance surface of the first optical path changing element at the incident angle of the first angle can be emitted to the output angle of the second angle while maintaining the light quantity, whereas in the light incident on the forward light exit surface of the first optical path changing element at the incident angle of the second angle, only a part of the light quantity of the incident light can be emitted to the output angle of the first angle due to the light width difference. This makes it possible to increase the difference between the forward transmittance and the backward transmittance.

The ratio (A/B) of the light width (A) of the light incident on the light entrance surface of each prism of the first optical path changing element at the incident angle of the first angle to the light width (B) of the light emitted from each prism to the output angle of the second angle may be 0.0001 or more. The ratio (A/B) may be 0.0001 or more, 0.0002 or more, 0.0003 or more, 0.0004 or more, 0.0005 or more, 0.0006 or more, 0.0007 or more, 0.0008 or more, 0.0009 or more, or 0.001 or more, where the upper limit is not particularly limited, but for example, it may be 1 or less. When the ratio (A/B) of the light width (A) of the light incident on the light entrance surface of each prism of the first optical path changing element at the incident angle of the first angle to the light width (B) of the light emitted from each prism to the output angle of the second angle satisfies the above range, it is possible to lower the transmittance of the light incident in the backward direction while emitting the light incident in the forward direction with high transmittance.

In one example, the prism included in the optical isolation element of the present application may have a refractive index in a range of 1.2 to 1.8. The refractive index may mean a value measured at a wavelength of 550 nm using a prism coupler manufactured by Metricon. The refractive index of the prism may be adjusted in a suitable range according to the thickness of the first optical path changing element and/or the second optical path changing element. For example, within the above range, the refractive index of the prism may be 1.20 or more, 1.25 or more, 1.30 or more, 1.35 or more, 1.40 or more, 1.45 or more, 1.50 or more, 1.55 or more, or 1.60 or more, and may be 1.80 or less, 1.75 or less, 1.70 or less, or 1.65 or less. The first optical path changing element and/or the second optical path changing element can emit predetermined incident light at a desired angle with excellent efficiency within a range satisfying the refractive index.

In an exemplary embodiment, the cross section of the unit prism structure of the first optical path changing element and the cross section of the unit prism structure of the second optical path changing element may be different from each other. At this time, the cross section means a vertical section orthogonal to the ridge line (direction) of a prism. The optical path changing element may comprise a plurality of unit prisms, where the ridge lines of the respective unit prisms may be arranged in parallel.

For example, the cross section of the unit prism structure of the first optical path changing element may be an inequilateral triangle prism shape, and the cross section of the unit prism structure of the second optical path changing element may be an isosceles triangle shape.

In the present application, a prism whose unit prism structure has a triangular cross section may be referred to as a triangular prism. For example, it may mean a prism whose vertical cross section orthogonal to the ridge line of the prism has a triangle shape, and more specifically, may mean a prism whose vertical cross section has a triangle shape with one base and two hypotenuses. In the present application, the base may be a forward light entrance surface or a backward light entrance surface, or may form a part of a forward light entrance surface or a part of a backward light entrance surface.

In the present application, the term "inequilateral triangular prism" may mean a triangular prism having (at least) two hypotenuses of the triangle shape of the vertical cross section orthogonal to the ridge line of the prism that are different from each other. In the present application, the term "isosceles triangle" may mean a triangle in which two hypotenuses have substantially the same length. The two hypotenuses of the isosceles triangle having substantially the same length may include an error within a predetermined range, for example, a case where the difference between two hypotenuse lengths is within 5% of the length of any one hypotenuse, as well as having substantially the same length. At this time, the side excluding the hypotenuses of the above-mentioned inequilateral or isosceles triangular cross section may be referred to as a base, where the base may be a forward light entrance surface or a backward light entrance surface, or may form a part of the forward light entrance surface or a part of the backward light entrance surface.

For example, the cross section of the unit prism structure included in the first optical path changing element may have a right triangle shape. The right triangle shape may mean a triangle in which one base and one hypotenuse are orthogonal. The base and one hypotenuse being orthogonal may mean that the angle formed by the base and the hypotenuse is about 90 degrees, and the angle may include the above-mentioned error range.

In an exemplary embodiment, the apex angle of the prism included in the first optical path changing element may be in a range of 5 degrees to 120 degrees. The apex angle may mean an angle formed by two hypotenuses of the inequilateral prism. For example, the prism included in the first optical path changing element may satisfy the apex angle and have a cross section of an inequilateral triangle. For example, within the above range, the apex angle of the prism included in the first optical path changing element may be 10 degrees or more, 15 degrees or more, 20 degrees or more, 25 degrees or more, 30 degrees or more, 35 degrees or more, 40 degrees or more, 45 degrees or more, 50 degrees or more, 55 degrees or more, or 60 degrees or more, and the upper limit may be 115 degrees or less, 110 degrees or less, 105 degrees or less, 100 degrees or less, 95 degrees or less, 90 degrees or less, 85 degrees or less, 80 degrees or less, 75 degrees or less, 65 degrees or less, or 60 degrees or less. Alternatively, for example, the prism included in the first optical path changing element may have a cross section of a right triangle satisfying the apex angle. By using a prism film comprising a triangular prism having a predetermined cross-sectional shape as the first optical path changing element, the light incident on the light entrance surface at the incident angle of the first angle can be emitted at the output angle of the second angle, and the light incident on the light exit surface at the incident angle of the second angle can be emitted at the first angle.

In another exemplary embodiment, the prism included in the second optical path changing element may be a prism whose apex angle is in a range of 5 degrees to 120 degrees. For example, the prism included in the second optical path changing element may have a triangular cross section satisfying the apex angle. For example, the prism included in the second optical path changing element may have an isosceles triangular cross section satisfying the apex angle. That is, in the prism having a triangular cross section, the apex angle may mean an angle formed by two hypotenuses, and for example, the lower limit may be 10 degrees or more, 15 degrees or more, 20 degrees or more, 25 degrees or more, 30 degrees or more, 35 degrees or more, 40 degrees or more, 45 degrees or more, 50 degrees or more, 55 degrees or more, or 60 degrees or more, and the upper limit may be 115 degrees or less, 110 degrees or less, 105 degrees or less, 100 degrees or less, 95 degrees or less, 90 degrees or less, 85 degrees or less, 80 degrees or less, 75 degrees or less, 65 degrees or less, or 60 degrees or less. When the apex angle of the triangular prism or the isosceles triangle prism satisfies the above range, the light incident on the light entrance surface of the prism at the incident angle of the second angle can be emitted to the output angle of the first angle, and the light incident on the light exit surface of the prism at the incident angle of the first angle can be emitted as the emission light at the second angle or the third angle. When the light incident on the light exit surface of the prism at the first angle is emitted as the emission light at the third angle, the emission light at the third angle may be blocked by a light control film to be described below. Thus, the light incident on the light exit surface of the optical isolation element can be prevented from being emitted to the incident surface, and the backward transmittance can be lowered.

In an exemplary embodiment, when a plurality of prism unit structures are included in the optical path changing element, the prism unit structures may have a structure connected to each other.

In an exemplary embodiment, the optical path changing element may comprise a plurality of unit prism structures having the same size and shape.

In an exemplary embodiment, the light control film included in the optical isolation element of the present application may be an absorbing louver film. The absorbing louver film may be a louver film that only transmits light incident at a predetermined angle and absorbs light incident at other angles. By using the absorbing louver film as the light control film, it is possible to only transmit light incident at a predetermined angle, and accordingly, the transmittance of light incident in the backward direction can be lowered.

In the absorbing louver film to be applied to the light control film, a plurality of louvers may be formed in a direction parallel to the above-described first angle. The louvers being formed in a direction parallel to the first angle may mean that the louvers are formed so that the light incident at the first angle may be transmitted. The direction parallel to the first angle may mean a direction including the above-described error range. When the absorbing louver film is formed in a direction parallel to the first angle, the light emitted at the first angle at the light entrance surface of the first optical path changing element can be transmitted, and the light emitted at an angle different from the first angle can be blocked.

The method for manufacturing the louver film applied to the present application is not particularly limited. For example, the louver film may comprise a light transmitting portion and a light absorbing portion. The light transmitting portion may be made of a polymer having high light transmittance. A thermoplastic resin, a thermosetting resin, a resin curable by actinic rays such as UV rays may be used as such a polymer. An example of such a resin may include a cellulose resin (for example cellulose acetate butyrate, triacetyl cellulose, etc.), a polyolefin resin (for example, polyethylene, polypropylene, etc.), a polyester resin (for example, polyethylene terephthalate, etc.), polystyrene, polyurethane, polyvinyl chloride, an acrylic resin, a polycarbonate resin, and the like. The light absorbing portion may be formed by attaching a film formed of a material that absorbs light or by vapor-depositing a material that absorbs light to the light transmitting portion. An example of such a material may include (1) a dark pigment or dye such as a black or gray pigment or dye of carbon black or the like, (2) a metal such as aluminum (Al), silver (Ag), copper (Cu), gold (Au), nickel (Ni), palladium (Pd), platinum (Pt) and chromium (Cr), (3) an oxide of the above metal, and (4) the above-described polymer containing a dark pigment or dye such as carbon black.

In an exemplary embodiment, the thickness of the light control film included in the optical isolation element of the present application may be in a range of 1 μm to 400 μm. The thickness of the light control film may be 1 μm or more, 2 μm or more, 3 μm or more, 4 μm or more, 5 μm or more, 6 μm or more, 7 μm or more, or 8 μm or more, and may be 400 μm or less, 390 μm or less, 380 μm or less, 370 μm or less, 360 μm or less, or 350 μm or less, but is not limited thereto.

In another exemplary embodiment, the thickness of the first optical path changing element and/or the second optical path changing element may be in a range of 5 μm to 500 μm. The thickness of the first optical path changing element and/or the second optical path changing element may be 5 μm or more, 6 μm or more, 7 μm or more, or 8 μm or more, and may be 500 μm or less, 490 μm or less, 480 μm or less, 470 μm or less, 460 μm or less, 450 μm or less, 440 μm or less, 430 μm μm or less, 420 μm μm or less, 410 μm μm or less, or 400 μm or less, but is not limited thereto. For example, the optical path changing element may comprise a triangular prism whose distance from the base to the vertex can satisfy the thickness range. Alternatively, the optical path changing element may have a structure comprising the above-described prism in the film satisfying the thickness range.

In another exemplary embodiment, the optical isolation element may comprise a light control film; a first prism film; and a second prism film, sequentially.

The first prism film and the second prism film may each be a film in which one or more unit prism structures are each linearly formed on one surface. The unit prism structure is a prism structure capable of having the above-described cross-sectional shape, which has directional ridge lines. The plurality of prism unit structures may be arranged such that the ridge lines of each structure may be parallel to each other, to form a prism film.

In an exemplary embodiment, each cross section of the unit prism structure may have a triangular shape, as described above, and may have a structure in which the bases have triangular shapes which are connected to each other. In this case, a portion corresponding to the base of the cross-sectional triangles that the respective unit prism structures have can form a light entrance surface or a light exit surface of the prism film, or a part thereof.

In an exemplary embodiment, the first and/or second prism films may comprise a plurality of unit prism structures having the same structure. For example, the first prism film may be a repeated prism structure having any one of the triangular cross sections illustrated in FIGS. 2A to 2E.

The unit prism structures of the first and second prism films may be formed to have apex angles on the forward light exit surfaces of the respective prism films. For example, they may be configured such that the cross section of the unit prism structure of the first prism film is an inequilateral triangle shape, the cross section of the unit prism structure of the second optical path changing element is an isosceles triangle shape and the apex angles face the forward light exit surface or are in contact with the forward light exit surface.

The details of the prism film and the light control film are the same as described above, and thus will be omitted.

The present application also relates to an optical isolation device. The optical isolation device of the present application may comprise at least one or more optical isolation elements as described above. The term "optical isolation device" is a device comprising an optical isolation element, which has an optical isolation function. Therefore, the optical isolation device is also configured such that the transmittance of the light incident in the forward direction is relatively larger than the transmittance of the light incident in the backward direction, where the contents mentioned in the optical isolation element can be applied equally to the ranges of the isolation ratio, forward transmittance and backward transmittance.

The optical isolation device may comprise one or two or more optical isolation elements as described above. In the case where two or more optical isolation elements are included, the respective optical isolation elements can be arranged along the forward direction such that the light transmitted through one of the optical isolation elements can be incident on the first optical path changing element side of the other optical isolation element. In this manner, the plurality of optical isolation elements can be arranged in the forward direction in series. By applying the plurality of optical isolation elements as described above, the optical isolation ratio can be further improved. Theoretically, the light transmitted through the plurality of optical isolation elements in the forward direction continues to be transmitted without loss, but in the case of the light transmitted in the backward direction, the light is continuously reduced by a factor of the square root thereof. Therefore, by controlling the number of the optical isolation elements, it is possible to maximize the optical isolation ratio.

In an exemplary embodiment, the ratio of the transmittance of the light incident in the forward direction and the transmittance of the light incident in the backward direction in the optical isolation device can be about 3 dB or more. The isolation ratio (IR) is calculated based on Equation 1 below:

$$IR = 10 \times n \times \log(F/B) \qquad \text{[Equation 1]}$$

In Equation 1, IR is an isolation ratio, n is the number of optical isolation elements, which are described below, included in the optical isolation device, F is the transmittance of the light incident on the optical isolation device in the forward direction, and B is the transmittance of the light incident on the optical isolation device in the backward direction.

The transmittance of the light incident in the forward direction of the optical isolation device may be about 50% or more, about 55% or more, about 60% or more, about 65% or more, about 70% or more, about 75% or more, about 80% or more, about 85% or more, about 90% or more, or about 95% or more. The upper limit of the forward transmittance may be about 100%. Also, the transmittance of the light incident in the backward direction of the optical isolation device may be about 50% or less, less than about 50%, about 45% or less, about 40% or less, about 35% or less, about 30% or less, about 25% or less, about 20% or less, about 15% or less, about 10% or less, about 5% or less, or about 1% or less. The lower limit of the backward transmittance may be about 0% or so.

Such an optical isolation device may also comprise additional components. For example, the optical isolation device may further comprise, if necessary, a light-path controller, such as a prism or a reflective plate, which can additionally control the light path, in addition to those included in the above-described optical isolation element.

In addition, the optical isolation device may comprise, if necessary, additional optical components other than the above. For example, the optical isolation device may comprise an optical component, such as a louver plate.

Such a louver plate or the like may be provided on, for example, the side where the light traveling in the forward direction finally exits, for example, before and/or behind the above-mentioned second optical path changing element.

The present application provides an optical isolation element and an optical isolation device having high forward transmittance and an excellent optical isolation ratio. Such an optical isolation element or device can be applied, for example, not only to the fields of optical communication or laser optics, security and privacy protection, but also to members for brightness enhancement in displays and military products requiring hiding and covering, and the like.

Hereinafter, the present application will be described in detail through examples. However, the scope of the present application is not limited by the scope given below.

Example 1

Using the optical modeling software, ASAP Pro 2014 V1 SP1 from Breault Research Organization, Inc., and the light tracing simulation software, light tools from Synopsys Inc., an optical isolation element was subjected to modeling so as to be capable of having the same optical paths as shown in FIG. 1, and numerical values with respect to transmittance in both directions, F and B, and isolation ratios were simulated. The modeled optical isolation element (1) was configured to have a structure in which a light control film (10), a first optical path changing element (20) and a second optical path changing element (30) were sequentially laminated. Specifically, the light control film (10) has absorbing layer louvers formed horizontally in the light traveling direction inside a resin having a refractive index of 1.5; the first optical path changing element (20) is an element forming a right triangular prism array having a refractive index of 1.52 and an apex angle formed on the forward light exit surface side of 52 degrees; and the second optical path changing element (30) is composed of an isosceles triangular prism array having a refractive index of 1.52 and an apex angle formed on the forward light exit surface side of 59 degrees. Then, the light control film (10), the first optical path changing element (20) and the second optical path changing element (30) were each set to have a thickness of 200 μm, a shape was subjected to computer modeling, in which the light control film (10), the first optical path changing element (20) and the second optical path changing element (30) were manufactured in one film form through lamination, and the transmittance in both directions, F and B, and isolation ratios were each calculated.

As a result, the forward transmittance (F) was 100% and the backward transmittance (B) confirmed by transmitting light in the opposite direction was 50%. The isolation ratio (IR) according to Equation 1 was about 3.01.

Example 2

A laminated structure having the same structure as that of Example 1 was subjected to modeling, except that as the first optical path changing element (20), an inequilateral prism array having a refractive index of 1.62 and an apex angle formed on the forward light exit surface side of 48 degrees was used; and as the second optical path changing element (30), an isosceles triangular array having a refractive index of 1.62 and an apex angle formed on the forward light exit surface side of 57 degrees was used.

The resultant forward transmittance (F) was 100% and the backward transmittance (B) confirmed by transmitting light in the opposite direction was 1%. The isolation ratio (IR) according to Equation 1 was about 20.

From the simulation results of Examples 1 and 2, it can be confirmed that there is a large difference between the forward transmittance and the backward transmittance in the optical isolation element of the present application and it can be confirmed that the optical isolation element having an excellent optical isolation ratio can be formed.

The invention claimed is:

1. An optical isolation element, comprising:
a light control film;
a first optical path changing element; and
a second optical path changing element,
wherein the light control film, the first optical path changing element and the second optical path changing element are positioned sequentially,
wherein a direction from the light control film to the second optical path changing element is a forward direction and a direction from the second optical path changing element to the light control film is a backward direction, wherein the first optical path changing element is configured to emit light incident along the forward direction on the first optical path changing element at a first angle as light output from the first optical path changing element at a second angle and to emit light incident along the backward direction on the first optical path changing element at the second angle as light output from the first optical path changing element at the first angle, wherein the first angle is different from the second angle, wherein the second optical path changing element is configured to emit light incident along the forward direction on the second optical path changing element at the second angle as light output from the second optical path changing element at the first angle and to emit light incident along the backward direction on the second optical path changing element at the first angle as light output from the second optical path changing element at the second angle and at a third angle, wherein the second angle is different from the third angle, wherein the first optical path changing element is configured to emit light incident along the backward direction on the first optical path changing element at the third angle as light output from the first optical path changing element at an angle different from the first angle, and wherein the light control film is configured to transmit light incident along the forward or backward directions at the first angle and to block light incident along the forward or backward directions at an angle different from the first angle.

2. The optical isolation element according to claim 1, wherein the first angle ranges from more than −90 degrees to less than 90 degrees, wherein the second angle ranges from 65 degrees to −5 degrees and or from 5 degrees to 65 degrees, and wherein the third angle is of the same as the second angle and has an opposite sign from a sign of the second angle.

3. The optical isolation element according to claim 1, wherein each of the first optical path changing element and the second optical path changing element is a prism film having a plurality of linear unit prism structures formed on one surface thereof.

4. The optical isolation element according to claim 3, wherein the prism film has a refractive index in a range of 1.35 to 1.70 based on the light having a wavelength of 550 nm.

5. The optical isolation element according to claim 3, wherein a cross section of each of the plurality of unit prism structures of the prism film of the first optical path changing element has an inequilateral triangle shape and a cross section of each of the plurality of unit prism structures of the prism film of the second optical path changing element has an isosceles triangle shape.

6. The optical isolation element according to claim 5, wherein the cross section of each of the plurality of unit prism structures of the prism film of the first optical path changing element has a right triangle shape.

7. The optical isolation element according to claim 1, wherein the light control film is an absorbing lever film.

8. An optical isolation device comprising at least two or more optical isolation elements according to claim 1, wherein the two or more optical isolation elements are arranged in series.

9. An optical isolation element, comprising:
a light control film;
a first prism film; and
a second prism film,
wherein the light control film, the first prism film and the second prism film are positioned sequentially,
wherein a direction from the light control film to the second prism film is a forward direction and a direction from the second prism film to the light control film is a backward direction,
wherein each of the first prism film and the second prism film comprises one or more unit prism structures on one surface thereof,
wherein the unit prism structure has a triangular cross-sectional shape having an apex angle on a forward light exit surface side,
wherein the triangular cross section of the unit prism structure of the first prism film has an inequilateral triangle shape, and
wherein the triangular cross section of the unit prism structure of the second prism film has an isosceles triangle shape, and
wherein a ratio (B/F) of transmittance (B) along the backward direction relative to transmittance (F) along the forward direction is 0.7 or less.

10. The optical isolation element according to claim 9, wherein the inequilateral triangle shape is a right triangle.

11. The optical isolation element according to claim 9, wherein the light control film is an absorbing lever film.

* * * * *